Nov. 4, 1924.  
B. C. SMITH  
LUBRICATING SYSTEM  
Filed March 28, 1922     2 Sheets-Sheet 1

1,513,868

INVENTOR  
B. C. Smith  
BY  
ATTORNEY

Nov. 4, 1924.
B. C. SMITH
1,513,868
LUBRICATING SYSTEM
Filed March 28, 1922     2 Sheets-Sheet 2
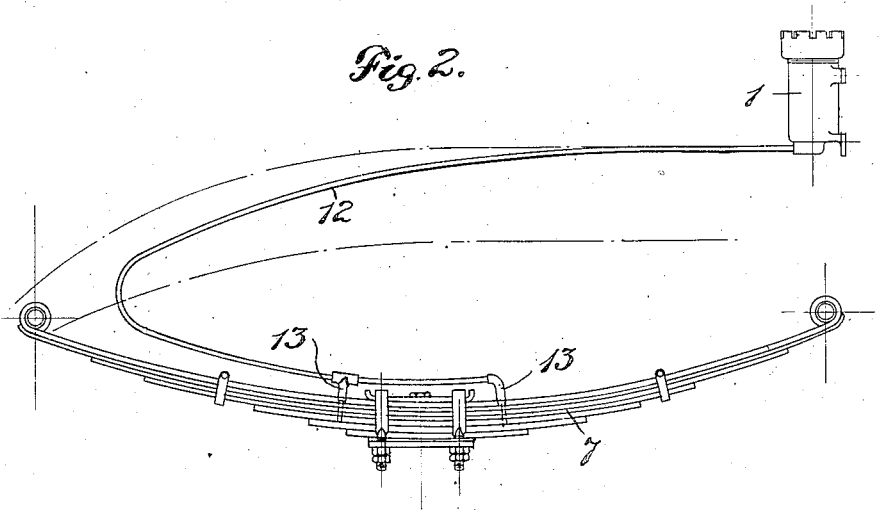
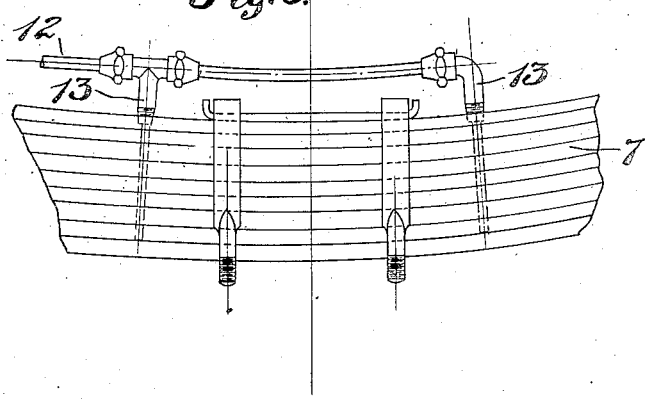
INVENTOR
B. C. Smith
BY
ATTORNEY Patented Nov. 4, 1924.

1,513,868

UNITED STATES PATENT OFFICE.

BENJAMIN C. SMITH, OF WESTFIELD, NEW JERSEY.

LUBRICATING SYSTEM.

Application filed March 28, 1922. Serial No. 547,385.

*To all whom it may concern:*

Be it known that I, BENJAMIN C. SMITH, a citizen of the United States of America, residing at Westfield, N. J., have invented a new and useful Lubricating System, of which the following is a specification.

My invention relates to an improved lubricating system which is particularly useful in connection with automobiles and the lubrication of the various joints including those associated with moving parts.

In the drawing:

Fig. 2 is a similar view of a modification.

Fig. 3 is a relatively enlarged view of certain parts shown in Fig 2.

Figure 1:
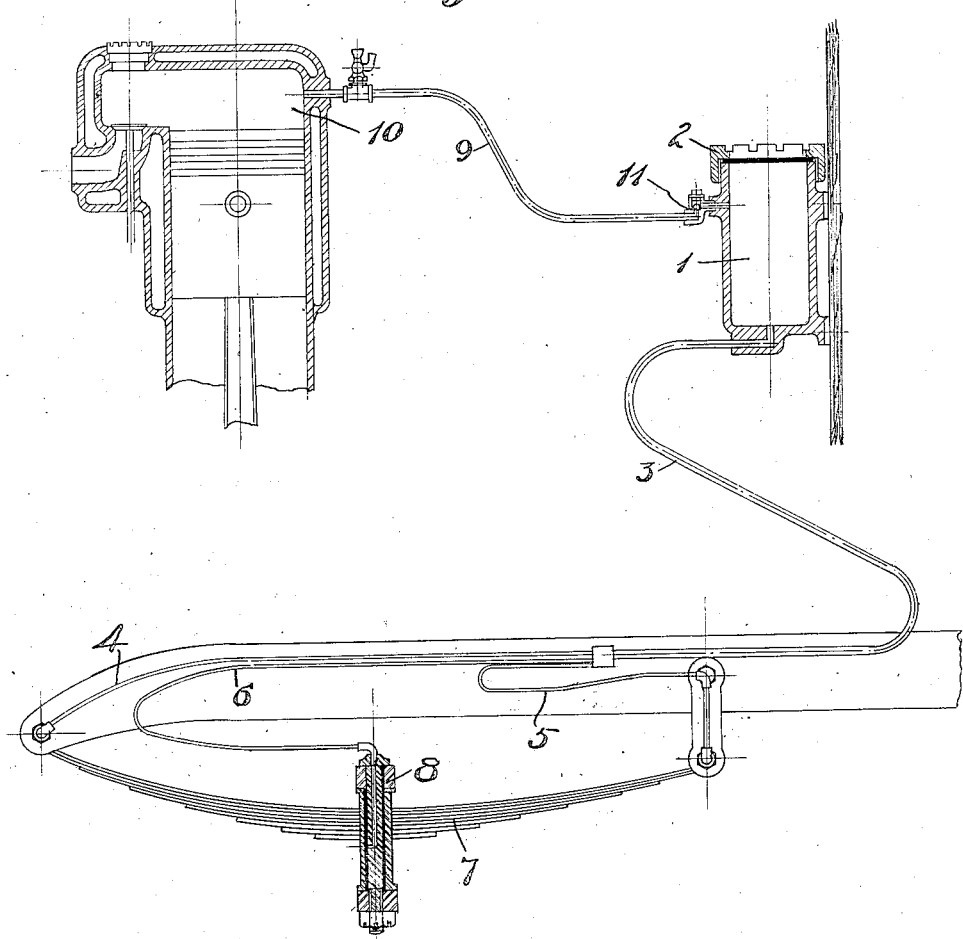
Fig. 1 is a diagrammatic view partly in section of my system in a preferred form.

1 represents a case or container which is preferably cylindrical in form and which may be provided with a removable cap 2 so fitted thereto as to form an air tight joint at the upper end. 3 is a pipe leading from the opposite end and having delivery branches 4, 5, 6. The pipe 4 leads to the front pivot of a load carrying spring 7. The pipe 5 leads to the shackle pins for said spring. The pipe 6 leads to what is conventionally illustrated as a steering knuckle 8. The delivery pipes 4, 5 and 6 are very small having an internal diameter or bore say of approximately three sixty-fourths of an inch. The lower part of the case 1 is filled with a relatively thick lubricant, such as grease, and heavy pressure must be applied to the surface of the grease to force it through the delivery pipes. The delivery pipes, by reason of their small bore, permit the grease to flow therethrough only very slowly. When the parts being lubricated are moving, the movement tends to rub off in the form of a thin film a portion of the grease at the exit end of the delivery pipe, this being continued so long as said movement continues. By preference I provide a connecting pipe 9 between the combustion chamber of the cylinder 10 and the interior of the case 1. In the form shown, the cylinder 10 represents conventionally the cylinder of an internal combustion engine. 11 is a check valve in the pipe line 9 which operates to hold the pressure in the case 1 during the exhaust and suction stroke of the engine piston. One substantial advantage is derived by providing pressure on the grease in the case 1 from the engine cylinder, to wit, pressure generation stops with the stopping of the motor, and starts with the starting thereof.

In Fig. 2 I have shown the grease delivery pipe as leading direct from the case 1 to outlets conveniently arranged between the spring leaves of the spring 7. In this case the pipe is indicated at 12 and the outlets at 13—13. As shown in Fig. 3 by dotted lines, the outlets 13—13 screw into a hole in the top leaf while the balance of the leaves with the exception of the bottom leaf are drilled so that grease may be forced between each of the spring leaves to keep them properly lubricated at all times.

While I have shown in the drawings the delivery pipes as leading to only certain parts to be lubricated, it will be understood that similar pipes may be led to any part of the vehicle where wear is likely to occur and where lubrication is desired. By this simple means, the lubricant may be put in in bulk at a single source and delivered therefrom automatically to every part of the mechanism associated with the vehicle where lubrication is desired. It will be understood that the delivery pipes must necessarily be so small as to effectively resist the too rapid flow of lubricant therethrough. While it is impossible to specify exactly the internal diameter of the delivery pipes, it is manifest that they must be sufficiently small to offer such resistance to the flow of the relatively thick lubricant so that the same will not be wasted. I have found that by this arrangement no controlling valve mechanism whatever is needed in said delivery pipes.

It will be understood of course that when the pipe is associated with parts that partake of movement, such as example the middle portion of a spring 7, the delivery pipe should be properly looped and made flexible. I have found that copper tubing has sufficient flexibility for this purpose.

What I claim is:

1. A lubricating system for automobiles and the like comprising, a container for holding a supply of relatively thick lubricant, such as grease, with means for making the same air tight at one end, a lubricant outlet at the other end and a delivery pipe leading therefrom to its destination, the bore of said delivery pipe being sufficiently small to prevent the passage of said lubricant excepting under heavy pressure, and means for applying heavy pressure within the cylinder at the end opposite the delivery pipe, said means being connected with the combustion chamber of an internal combustion engine.

2. In an automobile or other vehicle, a mechanical part to be lubricated, a container for holding a supply of relatively thick lubricant, such as grease, means for generating heavy pressure in one end of said container, a delivery pipe leading from said container to the mechanical part to be lubricated, the bore of said pipe being sufficiently small to prevent the flow of such lubricant therethrough excepting under high pressure, an internal combustion engine for said vehicle, and a pipe connection from the combustion chamber of said engine to said container, to furnish said pressure.

BENJAMIN C. SMITH.